United States Patent Office 2,957,237
Patented Oct. 25, 1960

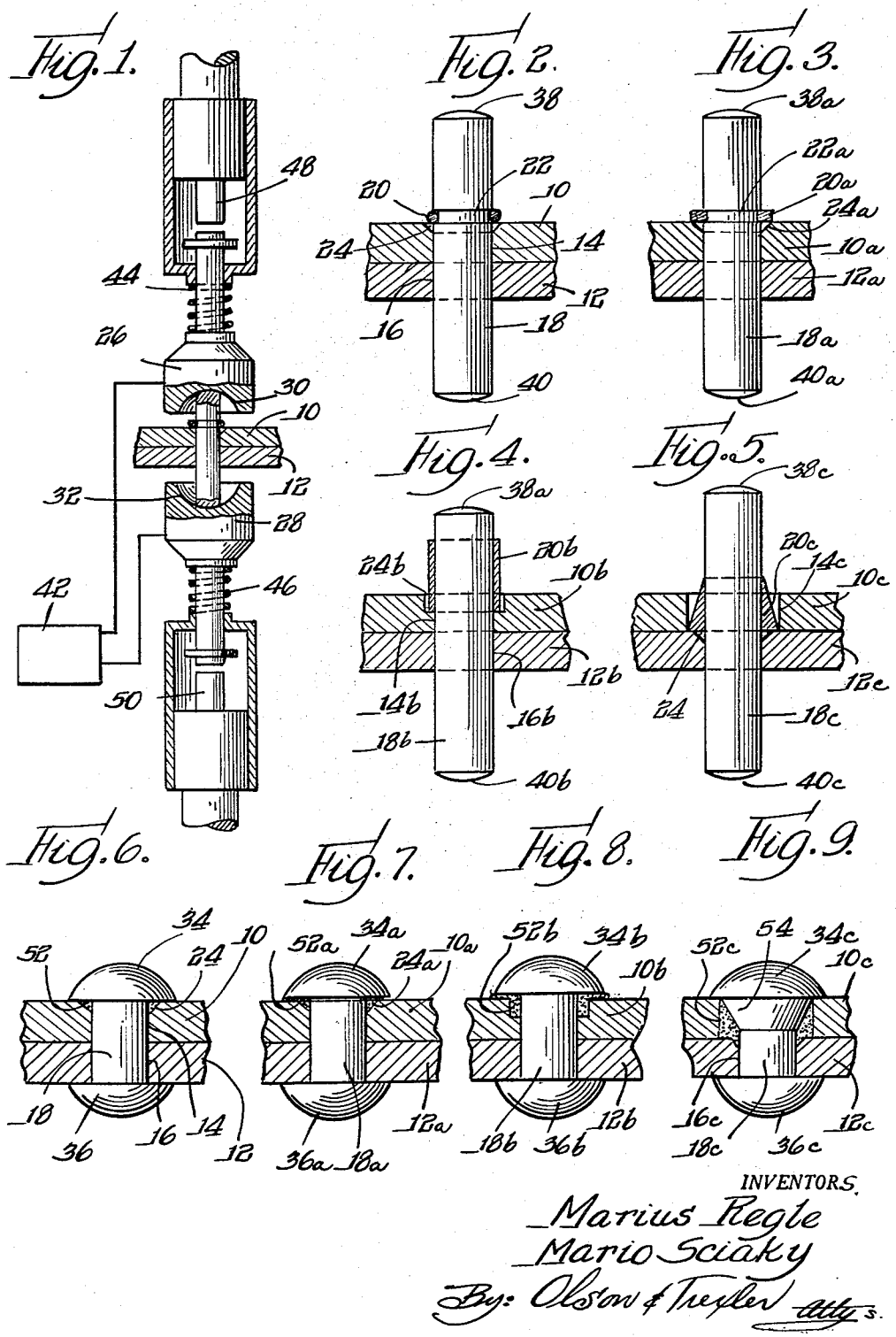

2,957,237

METHOD OF MAKING A BRAZED RIVETED CONNECTION

Marius Regle, Paris, and Mario M. Sciaky, Saint-Cloud, France, assignors to Welding Research, Inc., Chicago, Ill., a corporation of Illinois Filed Jan. 13, 1955, Ser. No. 481,686

6 Claims. (Cl. 29—470.5)

The present invention relates to a novel method and means for securing work parts together by riveting. This application is a continuation in part of our copending application Serial No. 269,176, filed January 31, 1952, and now abandoned.

When work parts such as boiler plates or plates for other types of tanks are secured together by riveting, the apertures in the plates through which the rivets extend must be sealed and this is particularly important when the tank being formed is to contain a fluid under pressure. It is, therefore, an important object of the present invention to provide a novel method and means for riveting parts together and for sealing the rivet apertures.

A more specific object of the present invention is to provide a novel method and means for riveting work parts together and simultaneously sealing the rivet apertures whereby the parts may be assembled in a rapid and economical manner.

Another more specific object of the present invention is to provide novel rivet means for securing apertured work parts together and simultaneously sealing the apertures.

Other objects and advantages of the present invention will become apparent from the following description and the accompanying drawings, wherein:

Fig. 1 is a diagrammatic sectional view showing an apparatus for securing work parts together with a rivet and for sealing the rivet apertures in accordance with the present invention;

Fig. 2 is a fragmentary sectional view showing rivet means embodying one form of the present invention inserted through aligned apertures in work pieces;

Figs. 3, 4, and 5 are views similar to Fig. 2 but respectively showing modified forms of the present invention; and Figs. 6, 7, 8, and 9 respectively show the embodiments of Figs. 2–5 after heads have been formed on the rivets and the apertures in the work pieces have been sealed.

In order to provide a strong riveted connection between work parts and sealed rivet apertures, the present invention, stated generally, is characterized in that a substantially headless cylindrical rivet or fastener is provided, a band or ring of metal having a lower melting point than the metal of the rivet is fixed on the rivet body, and then the rivet body is introduced through the work piece openings and opposite ends of the body are hammered and flattened simultaneously to form heads thereon while the body is heated. This procedure permits the accomplishment, during the riveting, of mechanical and thermal operations which are entirely symmetrical on both sides of the work pieces to be assembled and therefore assures a total and symmetrical filling of the work piece openings or apertures at both ends of the rivets and an equal tightening of the rivet into engagement with both sides of the work pieces along with a symmetrical formation of the rivet heads and suppression of formation of calamine or the like between any part of the rivet and the associated work pieces. In addition, this procedure permits melting of the band or ring on the rivet body and the formation of a brazed joint between the body and the work pieces to insure sealing of the work piece openings simultaneously with the forming of the heads on the rivet body.

Referring now more specifically to the drawings, wherein like parts are designated with the same numerals throughout the various figures, the present invention contemplates the fastening of a pair of work pieces 10 and 12 having aligned apertures 14 and 16 by the method and means shown in Figs. 1, 2 and 6. More particularly, a headless cylindrical rivet body 18 is provided which is adapted to be inserted through the work piece apertures as shown in Figs. 1 and 2. A band or ring 20 is fixed to the rivet body and is adapted to engage one of the work pieces positively to locate the body within the apertures. Preferably, the rivet body is provided with an annular recess 22 and the ring 20 is in the form of a piece of wire which is wrapped around the body within the recess, so that it is prevented from slipping along the body. In accordance with an important feature of the present invention, the rivet body is formed from steel or other suitable metal, while the band or ring 20 is formed from copper or bronze or any other suitable metal having a melting point substantially below the melting point of the metal from which the rivet body is formed. Thus, during heating and forming of the rivet body in the manner described below, the band or ring 20 is melted to provide a brazed joint between the rivet body and the work piece 10, which insures sealing of the aperture 14. Preferably, the outer end of the aperture 14 is countersunk as indicated at 24 to promote the formation of a satisfactory brazed joint between the work piece and the rivet.

The forming or heading of the rivets may be accomplished with hammers of any desired form to provide rivet heads having any desired contour. Furthermore, any suitable means may be provided for heating the rivets during the heading operation. However, in accordance with the present invention, electric heating of the rivets may advantageously be employed in the manner shown in Fig. 1. More particularly, the rivet means may be applied to the work pieces 10 and 12 in a cool condition, and then subjected to the action of rivet hammers 26 and 28 which form the ends of the rivet simultaneously into heads, and at the same time pass electric current through the rivet to effect electric resistance heating thereof. For the purpose of illustrating the present invention, the hammers 26 and 28 are shown as having hemispherical cavities 30 and 32, respectively, for forming hemispherical heads 34 and 36 on the rivet as shown in Fig. 6. Preferably, the ends of the rivet body 18 are initially rounded as indicated at 38 and 40. This promotes good electrical contact between the rivet body and the hammers and also the application of stresses symmetrically to the ends of the rivets since the rounded ends mate with the hammer recesses. As will be understood, the work engaging hammers 26 and 28 are electrically conductive and are supplied with electric current from a suitable supply apparatus 42. The hammers are maintained in engagement with the rivet ends by resilient means including springs 44 and 46, and the hammers are subjected to the action of impact hammers 48 and 50 diagrammatically shown. As the rivet heads are formed the rivet body is also simultaneously deformed so as to insure filling of the work piece apertures 14 and 16 and at the same time, the annular band 20 is melted to provide a brazed joint indicated by the numeral 52 in Fig. 6. Thus, it is seen that in accordance with the present invention, a very strong and sealed connection may be made between work pieces or plates in a rapid and economical manner.

Figs. 3 and 7 show a modification of the present invention wherein the rivet means is similar to the above described rivet means as indicated by the application of identical reference numerals with the suffix *a* added to corresponding elements. This embodiment differs in that instead of forming the annular ring 20*a* from round wire stock, the ring is formed from stock having a rectangular cross section, whereby additional material is provided for forming the brazed joint without changing the size of the annular recess 22*a* in which the ring seats. As will be understood, the rivet means shown in Figs. 3 and 7 may be heated and formed in accordance with the procedure described above.

In Figs. 4 and 8 there is shown another modified form of the present invention which is similar to the above described structures as indicated by the application of identical reference numerals with the suffix *b* added to corresponding elements. This embodiment differs in that the annular member 20*b* is in the form of an elongated sleeve which is frictionally retained on the rivet body 18*b*. Furthermore, the work piece or plate 10*b* is provided with a relatively deep annular recess or counterbore 24*b*. With this structure a more extensive brazed joint 52*b* is provided between the work piece and the rivet body or shank and also between the work piece and the head 34*b* of the rivet as shown in Fig. 8.

Still another embodiment of the present invention is shown in Figs. 5 and 9, which embodiment is similar to the above described structures as indicated by the application of identical reference numerals with the suffix *c* added to corresponding elements. In this embodiment, the aperture 14*c* in the work piece 10*c* has a diameter substantially greater than the diameter of the aperture 16*c* so that the annular member 20*c* is engageable with the work piece 12*c*. In addition, the work piece 12*c* rather than the work piece 10*c* is countersunk as at 24*c*. The annular member 20*c* is also in the form of an elongated sleeve frictionally retained on the rivet body but is provided with a frusto-conical surface. As a result of this structure, the brazed joint 52*c* extends not only between the work piece 10*c* and the rivet body but also between the work piece 12*c* and the rivet body and in addition, the shank of the rivet body will be enlarged as at 54, which enlargement cooperates with the head 36*c* positively to locate the rivet with respect to the work piece 12*c* and also serves in cooperation with the head 34*c* to clamp the work piece 10*c* against the work piece 12*c*.

From the above description it is seen that the present invention has provided a novel method and means whereby work pieces such as plates forming a part of a boiler, tank or the like may be riveted together in an economical manner and the rivet apertures in the plates may be sealed. More specifically, it is seen that the present invention has provided multipart rivet means of simple construction which may be easily applied to apertured work pieces and wherein the parts are formed from different materials, so that the apertures in the work pieces may be sealed by a brazed joint between the rivet body and the work pieces, which brazed joint is formed simultaneously with the riveting operation.

While the preferred embodiments of the present invention have been shown and described herein, it is obvious that many structural details may be changed without departing from the spirit and scope of the appended claims.

The invention is claimed as follows:

1. A method for connecting together apertured metal workpieces, which method includes the steps of positioning the workpieces in adjacent relationship with the apertures thereof in alignment, forming a composite rivet blank assembly by securing an annular member of brazing material with relatively small cross section to an intermediate portion of an elongated substantially headless metal body of substantially greater cross section to permit impact heading and with the elongated body formed of a metal having a relatively higher melting point than that of the brazing material of the annular member, positioning the rivet blank assembly through the aligned apertures of the workpieces with the annular member abutting the adjacent workpiece to position the rivet blank assembly relative to the positioned workpieces with the opposite ends of the body projecting from opposite faces of the opposed workpieces, impacting the opposite ends of the elongated body to deform the same into opposed heads, one overlying the annular member and adjacent workpiece and the other overlying the opposite workpiece, and substantially simultaneously heating the body and the annular member for flowing the brazing material to provide a brazed sealing joint between the headed body and at least one of the workpieces.

2. A method according to claim 1, wherein the annular member comprises a ring of copper secured to the elongated body.

3. A method according to claim 2, wherein the elongated body is recessed to receive the copper ring.

4. A method according to claim 1, wherein the workpiece adjacent the annular member of brazing material is recessed to receive the flowed brazing material in providing the brazed sealing joint.

5. A method according to claim 1, wherein both workpieces are recessed and the annular member is slightly elongated axially of the body to provide sufficient brazing material to seal the recesses in both workpieces.

6. A method according to claim 1, wherein the elongated body and annular member are heated by electric resistance heating thereof.

References Cited in the file of this patent

UNITED STATES PATENTS

| | | |
|---|---|---|
| 555,131 | Thomson | Feb. 25, 1896 |
| 2,129,583 | Johansson | Sept. 6, 1939 |
| 2,220,741 | Thorson | Nov. 5, 1940 |
| 2,364,109 | Taylor | Dec. 5, 1944 |
| 2,464,541 | Young | Mar. 15, 1949 |
| 2,512,426 | Hartley | June 20, 1950 |
| 2,522,329 | Wolff | Sept. 12, 1950 |
| 2,646,995 | Thompson | July 28, 1953 |
| 2,779,998 | Bailey | Feb. 5, 1957 |